May 17, 1966  A. E. MAINE  3,252,073
PULSE-WIDTH MODULATING DEVICES
Filed March 9, 1962  2 Sheets-Sheet 1

Inventor
Arthur Edward Maine
By
Karl W. Flocks
Attorney

United States Patent Office 3,252,073
Patented May 17, 1966

3,252,073
PULSE-WIDTH MODULATING DEVICES
Arthur Edward Maine, Agincourt, Ontario, Canada, assignor to The De Havilland Aircraft Company Limited, a company of Great Britain
Filed Mar. 9, 1962, Ser. No. 178,763
Claims priority, application Great Britain, Mar. 10, 1961, 8,921/61
9 Claims. (Cl. 321—5)

This invention relates to improvements in pulse width modulating devices.

It is an object of the present invention to provide an improved pulse-width modulating device whereby the electrical power available from the voltage or current pulses is capable of being varied or is capable of being controlled or maintained at a selected value.

It is a further object of the present invention to provide an improved pulse-width modulating device which is free from rotating parts, which shall be compact and economic to manufacture and which shall be particularly, but not exclusively, suitable for use in aircraft.

According to the present invention a pulse-width modulating device comprises means for deriving two voltages or currents of similar square waveform phase displaced one with respect to the other, means for combining the two voltages or currents to produce a single pulse train, alternate pulses of which are of opposite polarity with respect to a selected datum and the width of the individual pulses of which is a function of said phase displacement and means for controlling the relative phase displacement of said two voltages or currents.

It will be understood that a voltage or current of square waveform is one which, alternately, for equal lengths of time, assumes one of two fixed values, the time of transition being negligible in comparison and minor departures from the ideal waveform being included in the definition.

One embodiment of the invention will now be described by way of example, reference being made to the accompanying drawings in which.

Figure 1:
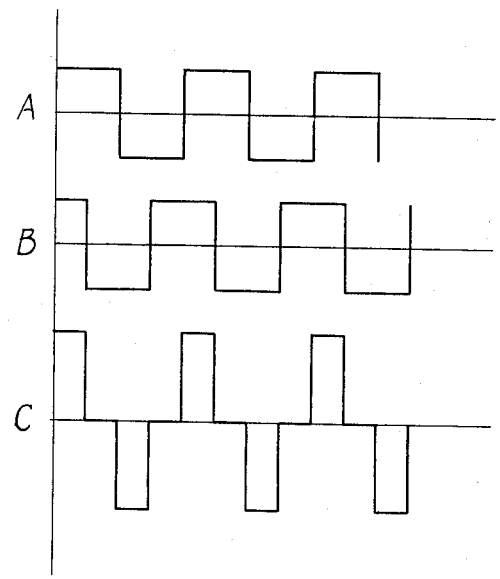
FIGS. 1A, 1B and 1C are waveform diagrams.

The pulse-width modulating device of this example is a D.C.-A.C. inverter such as is described in our copending application Serial No. 178,726, filed March 9, 1962, and operates on the principle that the addition of two similar square waves which are phase displaced relative to each other produces a train of pulses, alternate pulses of which are of opposite polarity with respect to a selected datum and the width of the individual pulses of which is a function of the phase displacement referred to. This is illustrated in FIG. 1 in which FIGS. 1A and 1B illustrate two similar square waves which are phase displaced relative to each other and, when added together, produce the waveform illustrated in FIG 1C which is a pulse train, the alternate pulses of which are of opposite polarity with respect to a selected datum and the width of the individual pulses of which is a function of the phase displacement of the square waves of FIGS. 1A and 1B.

The electrical power available from the voltage or current pulses illustrated in FIG. 1C is a function of the pulse-width of these pulses and hence a function of the relative phase displacement of the voltage or current square waveforms ilustrated in FIGS. 1A and 1B.

In some applications the pulse train illustrated in FIG. 1C may be used directly as a source of electrical power and in other applications it may be filtered to derive the fundamental thereof which is a sine wave having a frequency which is a function of the pulse repetition frequency of the square waveforms illustrated in FIGS. 1A and 1B.

Figure 2:
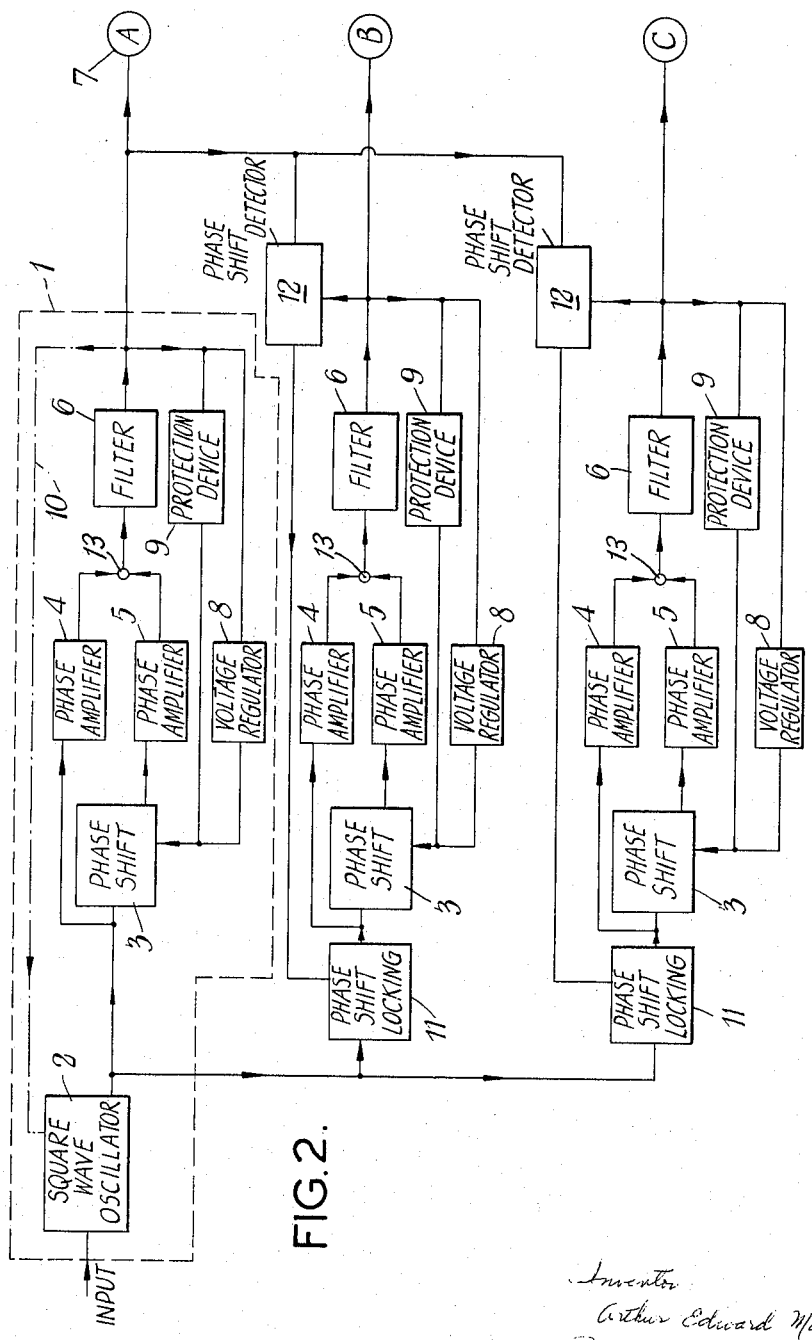
FIG. 2 is a block schematic diagram of a pulse width modulating device whereby three pulse trains are obtained phase displaced with respect to each other.

The pulse-width modulating device or D.C.-A.C. inverter illustrated in FIG. 2 for deriving a three-phase output will now be described, reference being first made to the units incorporated in the block 1 (referred to hereafter as a "phase-producing unit") which may be considered to be a D.C.-A.C. inverter for deriving a single phase output. This inverter comprises a D.C. controlled square wave oscillator 2 which produces voltage pulses of square waveform as illustrated in FIG. 1A and these are supplied to a phase shifting device 3 and to a first phase amplifier 4. The phase shifting device 3 produces a square wave voltage output such as illustrated in FIG. 1B which is phase displaced with respect to the waveform derived from the oscillator 2 and which is supplied to the second phase amplifier 5. The phase shifting device 3 may be any suitable device, but desirably, it is that described in our copending application Serial No. 147,307 dated October 24, 1961. The square waves derived from the phase amplifiers 4 and 5 are summed by a summing device indicated at 13. The summing is conveniently achieved by incorporating transformers (not shown) in the outputs of the amplifiers 4 and 5, the secondary windings of the transformers being connected in series. The summed output is a pulse train such as illustrated in FIG. 1C and is supplied to a filter network 6 which derives from the pulse train the fundamental thereof which is a sine wave having a frequency which is a function of the pulse repetition frequency of the output of the oscillator 2 and an amplitude which is a function of the width or so-called "firing-angle" of the pulses of the pulse train, and which may therefore be controlled by controlling the phase displacement produced by the device 3. The sine wave output is supplied to an output terminal 7. As will be understood, the power taken from the phase-producing unit 1 is a function of the impedance of the load and the voltage applied across the load. Hence the power available is a function of the output voltage at the terminal 7 and may be controlled by controlling this voltage. The output of the filter 6 is monitored by a voltage regulator 8 connected between this output and the phase shifting device 3 and which operates to sense any departure of the output voltage from the filter 6 from a predetermined value and to vary the phase shift introduced by the device 3 in the sense to oppose any such variation in the output voltage. Additionally, a protection device 9 is connected between the output of the filter 6 and the phase shifting device 3 to protect the phase-producing unit against over-load and responds to any undesired variation in the output of the filter 6 such as the load going on short circuit to change the phase-displacement produced by the device 3 to 180° to provide substantially zero input to the filter 6 when such undesired variation occurs.

It will be appreciated that the device 9 may be such as to respond to changes in frequency, current and/or voltage of the output of the filter 6 outside predetermined limits to change the phase displacement produced by the device 3 to substantially 180°. Alternatively the protection device 9 may be arranged to switch off the oscillator 2 as will be understood.

As has been mentioned above, the pulse train appearing at the input of the filter 6 may be used directly as a source of electrical power, in which case the filter 6 may be omitted.

The phase amplifiers 4 and 5 advantageously incorporate silicon controlled rectifiers which are capable of handling high input voltage transients and of operating at high temperatures. Though such rectifiers are not readily controlled by variation of their conduction angle they are particularly suitable in the present apparatus where, in fact, they are used as switches and are either switched hard on by the applied square waveform or rendered non-conducting. The frequency of the output appearing at the terminal 7 may also be controlled by suitable means represented by the chain-dotted line 10 extending from the output of the filter 6 to the square wave oscillator 2 and operable to modify the pulse repetition frequency of the output of the oscillator 2 to oppose any change in frequency of the output of the filter 6 from a selected value.

In order to derive a three-phase output the single phase device described above is associated with two further phase-producing units similar to the phase-producing unit 1, the oscillator 2 being common to all three phase-producing units and like reference numerals being used to denote like parts. Each of these further phase-producing units however incorporates a phase shifting unit 11 connected between the oscillator 2 and the associated phase-shifting device 3 to phase displace the output of the oscillator 2 by 120° in the case of the second phase-producing unit and by 240° in the case of the third phase-producing unit. A phase shift detector 12 is connected to the output terminal 7 and the output of the associated filter 6 to compare the relative phases and to respond to any departure of the relative phases from 120° or 240° by controlling the associated phase shifting unit 11 in the sense to oppose any departure of the phase of the output of the phase-producing unit from its desired value.

In the second and third phase-producing units the frequency controlling means 10 is omitted.

It will be appreciated that the device described produces three pulse trains such as illustrated in FIG. 1C which are phase displaced, the second by 120° with respect to the first, and the third by 240° with respect to the first.

It will also be appreciated that by appropriate adjustment of the phase shifting units 11 and phase shift detectors 12 the relative phases of the three pulse trains such as illustrated in FIG. 1C may be adjusted to any desired values.

What I claim is:

1. A pulse-width modulating device which includes, in combination, a square-wave oscillator the output of which is a first electrical square-wave, a phase-shifting device electrically connected to the output of said oscillator to derive directly from said first electrical square-wave a second electrical square-wave similar to but phase-displaced relatively to said first electrical square-wave, a summing unit, electrically connected to the output of said oscillator and to the output of said phase-shifting device, for adding together said first and second electrical square-waves to produce a pulse- train, whereby the pulse-width of said pulse train is determined by the relative phase displacement of said first and second electrical square-waves, and control means electrically connected to control said phase-shifting device to vary said relative phase displacement and thereby vary said pulse-width of said pulse-train.

2. A device as claimed in claim 1, which includes a first amplifier operatively electrically arranged in said connection between said oscillator and said summing unit, and a second amplifier operatively electrically arranged in said connection between said phase-shifting device and said summing unit.

3. A device as claimed in claim 2, wherein at least one of said amplifiers includes silicon controlled rectifiers arranged to be switched between a first, highly conducting state and a second, non-conducting state, by the input signal to that amplifier.

4. A device as claimed in claim 1, which includes a filter unit electrically connected to the output of said summing unit and arranged to filter said pulse train to derive an alternating electrical signal of substantially sinusoidal form.

5. A device as claimed in claim 4, which said filter unit is arranged to derive said alternating electrical signal by transmitting the fundamental frequency of the pulse train.

6. A device as claimed in claim 4, in which said control means includes an amplitude regulator responsive to the amplitude of said alternating electrical signal and electrically connected to control said phase-shifting device to vary said relative phase displacement in the sense to oppose changes in said amplitude of said alternating electrical signal.

7. A pulse-width modulating device which includes, in combination, a square-wave oscillator the output of which is a first electrical square-wave, a phase-shifting device electrically connected to the output of said oscillator to derive directly from said first electrical square-wave a second electrical square-wave similar to but phase-displaced relatively to said first electrical square-wave, a summing unit, electrically connected to the output of said oscillator and to the output of said phase-shifting device, for adding together said first and second electrical square-waves to produce a pulse-train, whereby the pulse-width of said pulse train is determined by the relative phase displacement of said first and second electrical square-waves, control means electrically connected to control said phase-shifting device to vary said relative phase displacement and thereby vary said pulse-width of said pulse-train, and a filter unit electrically connected to the output of said summing unit and arranged to filter said pulse train to derive an alternating electrical signal of substantially sinusoidal form, in which said control means includes a protection device responsive to departure of the amplitude of said alternating electrical signal from within predetermined limits and electrically connected to control said phase-shifting device to change said relative phase displacement to 180° in response to occurrence of such departure.

8. A pulse-width modulating device which includes, in combination, a square-wave oscillator the output of which is a first electrical square-wave, a phase-shifting device electrically connected to the output of said oscillator to derive directly from said first electrical square-wave a second electrical square-wave similar to but phase-displaced relatively to said first electrical square-wave, a summing unit, electrically connected to the output of said oscillator and to the output of said phase-shifting device, for adding together said first and second electrical square-waves to produce a pulse-train, whereby the pulse-width of said pulse-train is determined by the relative phase displacement of said first and second electrical square-waves, and control means electrically connected to control said phase-shifting device to vary said relative phase displacement and thereby vary said pulse-width of said pulse-train, in which said control means includes a protection device repsonsive to departure of the pulse repetition rate of said pulse train from within predetermined limits and electrically connected to control said phase-shifting device to change said relative phase displacement to 180° in response to occurrence of such departure.

9. A pulse-width modulating device which includes, in combination, a square-wave oscillator the output of which is a first electrical square-wave, a phase-shifting device electrically connected to the output of said oscillator to derive directly from said first electrical square-wave a second electrical square-wave similar to but phase-displaced relatively to said first electrical square-wave, a summing unit, electrically connected to the output of said oscillator and to the output of said phase-shifting device, for adding together said first and second electrical square-waves to produce a pulse-train, whereby the pulse-width of said pulse-train is determined by the relative phase displacement of said first and second electrical square-waves, control means electrically connected to control said phase-shifting device to vary said relative phase displacement and thereby vary said pulse-width of said pulse-train, and a frequency regulator responsive to the pulse repetition rate of said pulse-train and electrically connected to control said oscillator to vary the frequency thereof in the sense to oppose changes in pulse repetition rate of said pulse-train.

References Cited by the Examiner

UNITED STATES PATENTS

| | | | |
|---|---|---|---|
| 2,668,938 | 2/1954 | Henrich | 321—54 X |
| 2,798,970 | 7/1957 | Hall et al. | 332—12 X |
| 3,010,062 | 11/1961 | Van Emden | 321—45 |
| 3,125,726 | 3/1964 | Clifton | 332—12 |

LLOYD McCOLLUM, *Primary Examiner.*

MAX L. LEVY, *Examiner.*

G. J. BUDOCK, J. C. SQUILLARO, G. GOLDBERG,
*Assistant Examiners.*